United States Patent [19]

Berg

[11] Patent Number: 4,706,775
[45] Date of Patent: Nov. 17, 1987

[54] ANTI-THEFT COVER ASSEMBLY

[76] Inventor: Marlin C. Berg, 5851 Farmington Rd., West Bloomfield, Mich. 48033

[21] Appl. No.: 918,897

[22] Filed: Oct. 15, 1986

[51] Int. Cl.[4] .......................... B60R 25/00; B62H 5/00
[52] U.S. Cl. ...................................... 180/289; 70/237; 70/163; 296/152
[58] Field of Search .................. 180/287, 289; 70/158, 70/163, 237, 455, DIG. 81; 296/152

[56] References Cited

U.S. PATENT DOCUMENTS

| 2,472,793 | 6/1949 | Conterno | 70/158 |
| 2,575,401 | 11/1951 | Simmons | 70/163 |
| 3,112,951 | 12/1963 | Deer | 296/152 |
| 3,263,462 | 8/1966 | Suroff et al. | 70/455 |

Primary Examiner—John J. Love
Assistant Examiner—Kenneth R. Rice
Attorney, Agent, or Firm—Krass & Young

[57] ABSTRACT

An anti-theft cover assembly for use on the interior panel of an automobile door of the type including a door locking mechanism actuable by an actuator positioned in an opening in the interior door panel. The cover assembly includes a rigid cover plate sized and configured to fit over and cover the actuator. The cover plate includes a generally rectangular main body portion, a lip portion extending around the main body portion and a locator flange portion extending inwardly from the top edge of the main body portion and sized to fit within a recess in the door panel of the vehicle to provide a piloting action for the cover plate. A first magnetic tape is secured to the inner face of the main body portion of the cover plate and a second magnetic tape is secured to the door panel in surrounding relation to the actuator. The magnetic tape on the door panel fits snuggly within the lip portion of the cover with the cover in its anti-theft position. In a second embodiment, an attachment plate is secured to the door panel in surrounding relation to the actuator and the attachment plate includes clips which snappingly coact with lugs on the cover to maintain the cover in its position overlying the actuator. In a third embodiment, VELCRO fasteners are provided to releasably secure the cover to the door panel.

11 Claims, 9 Drawing Figures

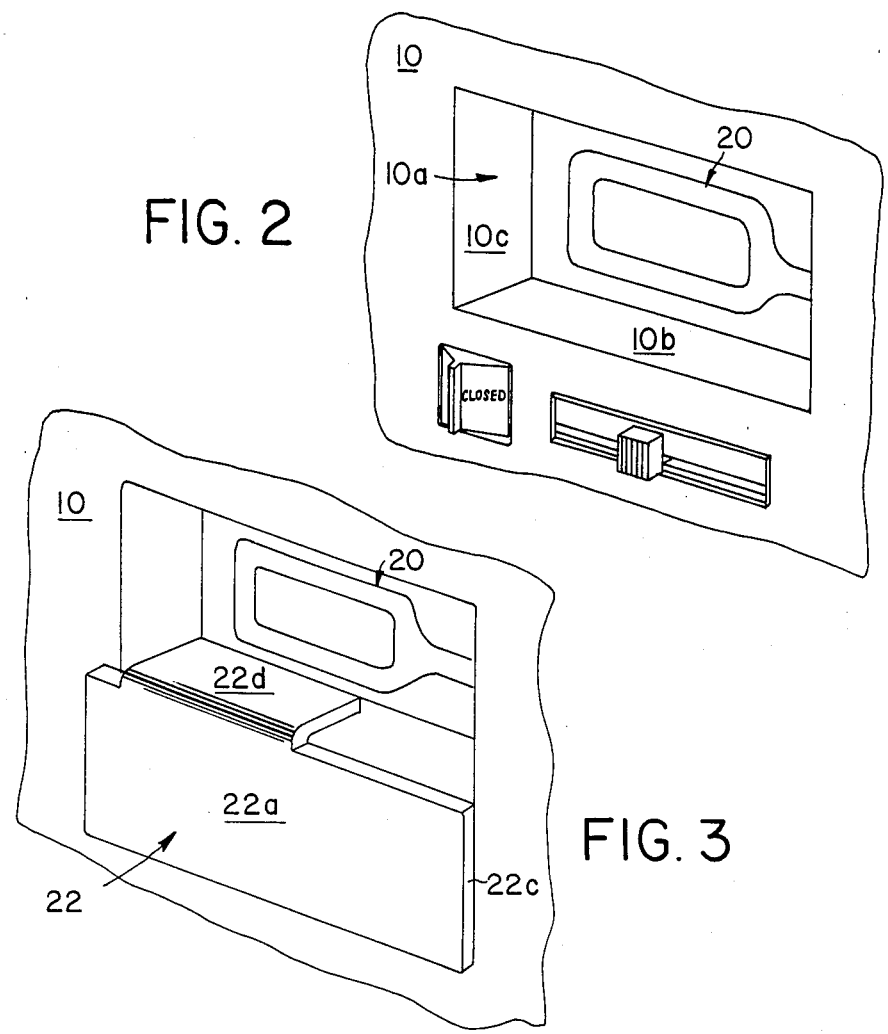
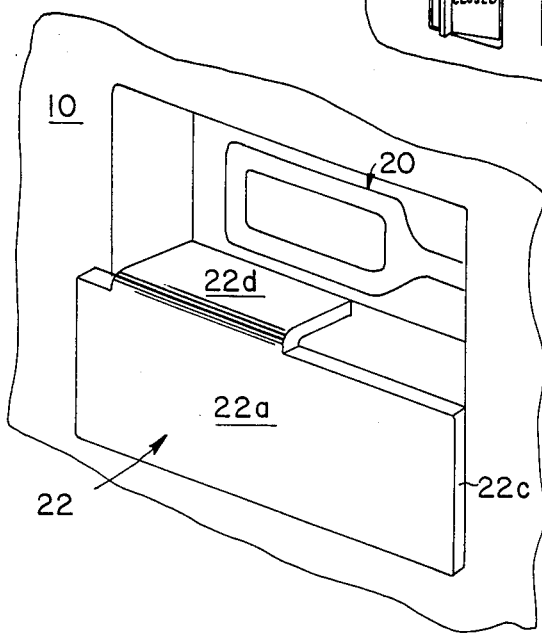
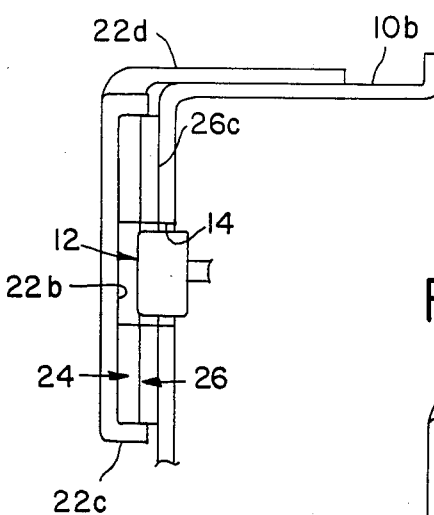
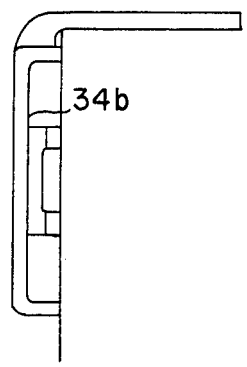

ANTI-THEFT COVER ASSEMBLY

BACKGROUND OF THE INVENTION

This invention relates to anti-theft devices for automobiles and more particularly to a cover assembly for use on the interior door panel of an automobile to prevent theft of the automobile or its contents by unauthorized actuation of the door lock actuator member positioned in the interior door panel.

Automobile theft, whether of the vehicle itself or the vehicle contents, has been a major problem ever since the advent of the automobile. The problem has been made more severe by the recent popularity of actuator members positioned in the interior door panel of the automobile and actuable when moved to lock and unlock the associated door locking mechanism. Whereas these actuators members provide a convenient means of locking and unlocking the doors of the vehicle, they are especially vulnerable to thieves since they can readily be moved between their locked and unlocked positions by virtue of a stick or the like inserted through an elastomeric window seal or door seal of the vehicle.

SUMMARY OF THE INVENTION

This invention is directed to the provision of an anti-theft cover assembly to preclude unauthorized access to the actuator member of a door locking mechanism.

The anti-theft cover assembly of the invention includes a rigid cover plate member sized and configured to fit over and cover the actuator member of the door locking mechanism; attachment means adapted to be secured to the door panel adjacent the actuator member; and securement means on the cover plate member coacting with the attachemnt means to releasably mount the cover plate member on the interior door panel in a position overlying the actuator member to preclude unauthorized access to the actuator member. This arrangement provides and inexpensive and efficient means of deterring vehicular theft by unauthorized access to the actuator member of the door locking mechanism.

According to a further feature of the invention, the cover plate member includes a planar main body portion and a lip portion extending around the periphery of the main body portion and extending inwardly from the inner face of the main body portion. This arrangement allows the cover plate to overly the actuator member while allowing room for the actuator member to project into the hollow or recess of the cover plate member.

According to a further feature of the invention, the cover plate member further includes a locator flange portion extending inwardly from the inner face of the main body portion along one side of the main body portion and at reight angles with respect to the main body portion and sized to move into a recess in the inner door panel adjacent the actuator member to locate the cover plate member relative to the actuator member. This arrangement allows the cover plate member to be readily positioned on the door panel and readily located relative to the actuator member.

According to a further feature of the invention, tha attachment means adapted to be secured to the door panel comprises a sheet member including a cutout sized to clear the actuator member and the sheet member is positioned on the interior door panel with the cutout in surrounding relation to the actuator member. This arrangement provides a ready and convenient means of securing the attachment means of the cover assembly to the interior door panel.

According to a further feature of the invention, the attachment sheet member has a size and configuration sized to fit snugly within the lip portion of the cover plate member so as to preclude lateral movement of the cover plate member on the interior door panel when the cover plate member is positioned over the sheet member. This arrangement provides a ready and convenient means of precluding lateral movement of the cover plate so that the cover plate cannot be displaced laterally to expose the actuator member.

In one embodiment of the invention, the attachment means comprises a first magnetic tape member adapted to be secured to the surface of the interior door panel surrounding the actuator member and a second magnetic tape member secured to the inner face of the cover plate member.

In a second embodiment of the invention the attachment means comprises an attachment plate having a cutout to clear the actuator member and including peripheral catch means and coacting catch means on the periphery of the cover plate member. For example, the peripheral catch means on the attachment plate may comprise spring clip means positioned on diametrically opposed side edges of the attachment plate and the catch means on the cover plate member may comprise lug means positioned on diametrically opposed side edges of the cover plate member.

In a third embodiment of the invention, the attachment means comprise gripping strips secured to the inner face of the cover plate member and gripping strips of a complimentary configuration secured to the interior door panel adjacent the actuator member.

BRIEF DESCRIPTION OF THE DRAWINGS

FIG. 2 is a fragmentary perspective view of a portion of the interior door panel of FIG. 1;

FIG. 3 is a view similar to FIG. 2 but showing the invention cover plate assembly applied to the interior door panel;

FIG. 5 is a cross-sectional view showing the assembled relation of the cover plate assembly of FIG. 4;

FIG. 7 is a cross-sectional view showing the assembled relation of the cover plate assembly of FIG. 6;

FIG. 9 is a cross-sectional view showing the assembled relation of the cover plate assembly of FIG. 8.

DETAILED DESCRIPTION OF THE PREFERRED EMBODIMENT

The invention anti-theft cover assembly is intended for use on the interior panel 10 of an automobile door assembly of the type including a door locking mechanism actuable by an actuator member positioned in an opening in the interior door panel and movable by an operator positioned within the vehicle between locked and unlocked positions to respectively lock and unlock the door.

Figure 1:
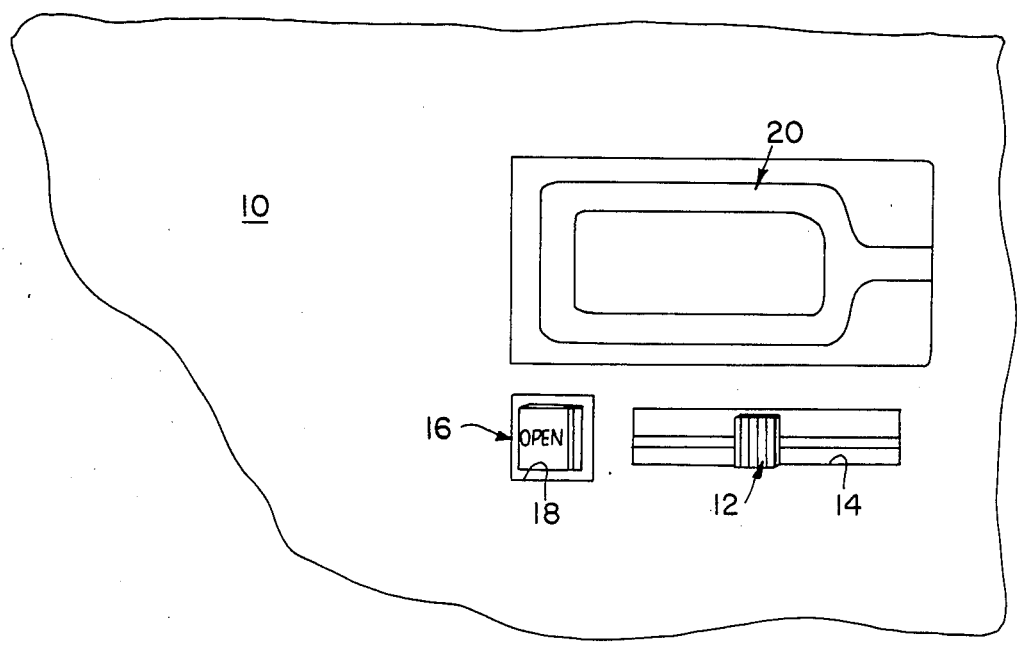
FIG. 1 is a fragmentary elevational view of an interior door panel of an automobile assembly.

As seen in FIG. 1, and as is typical in many high-priced automobiles, the door locking mechanism is controlled by a manually actuable slide member 12 movable fore and aft in a slot 14 in the door panel to lock and unlock the door locking mechanism and an electric power door lock actuator member 16 in the form, for example, of a toggle member positioned in an opening 18 in panel 10. Door panel 10 further includes a recess 10a defined in part by a horizontal wall 10b and a vertical wall 10c and housing a door handle 20 for latching and unlatching the door once the door has been placed in an unlocked condition by actuation of manual member 12 or power member 16.

Figure 4:
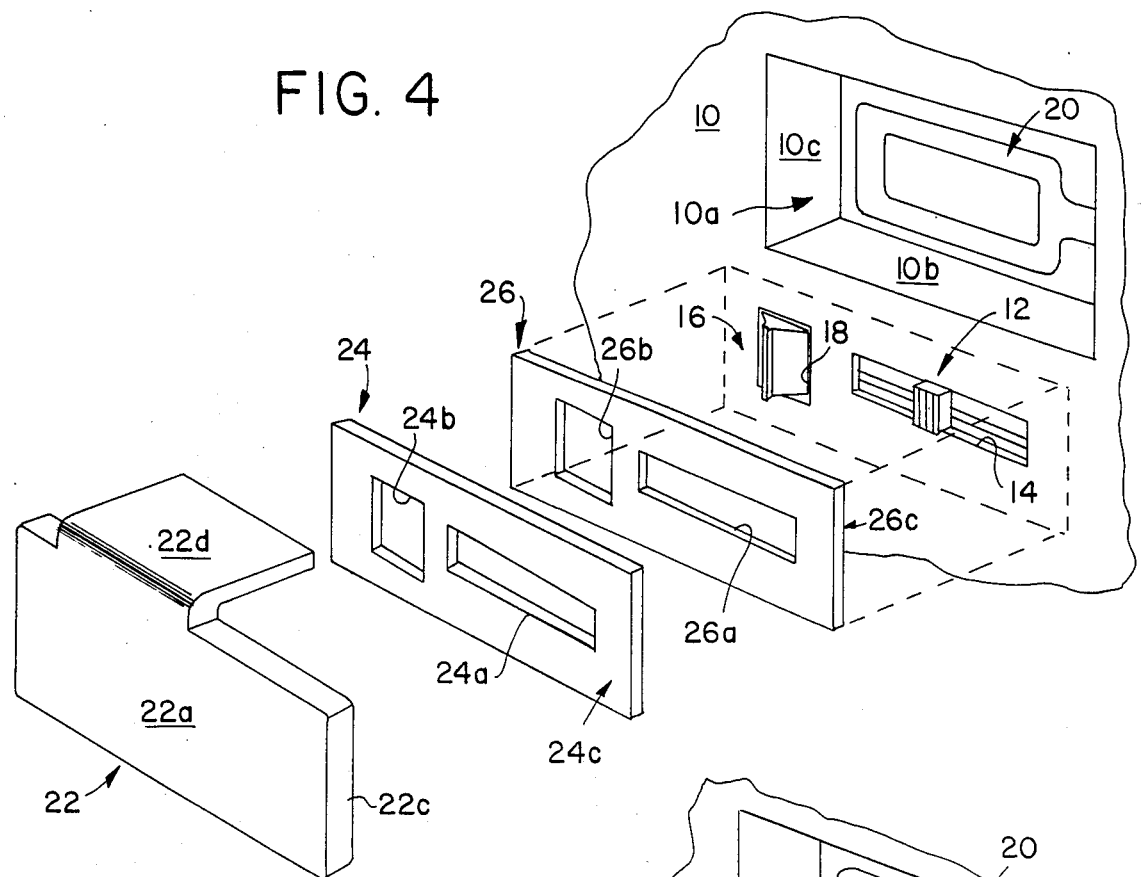
FIG. 4 is an exploded fragmentary perspective view showing a first embodiment of the invention cover plate assembly.

The anti-theft cover assembly of the FIGS. 4 and 5 embodiment includes a cover plate member 22, a first magnetic tape member 24, and a second magnetic tape member 26.

Cover plate member 22 is formed of a suitable plastic material and includes a planar generally rectangular main body portion 22a having an inner face 22b; a lip portion 22c extending completely around the periphery of the main body portion and extending inwardly from the inner face 22b of the main body portion; and a locator flange portion 22d extending inwardly from the inner face 22b of the main body portion along the upper side of the main body portion and at right angles with respect to the main body portion and sized to move into the recess 10a in panel 10 to locate the cover plate member relative to actuators 12 and 16.

Specifically, locator flange portion 22d has an inwardly extending dimension generally corresponding to the inwardly extending dimension of interior door panel wall 10b; has a forward edge 22e spaced rearwardly from the forward edge 22f of lip portion 22c by a measured, predetermined amount so as to properly position the cover plate member over actuators 12, 16 by moving locator flange forward edge 22e into abutting relation with interior door panel wall 10c; and has a front to rear dimension that is substantially less than the front to rear dimension of recess 10a so as to allow the locator flange portion to move easily into the recess 10a.

Magnetic tape member 24 is formed from a sheet of magnetic tape material having adhesive means on one side thereof. Member 24 is rectangular and includes cutouts 24a and 24b corresponding in size and shape to cutouts 14 and 18 respectively in the door panel 10. Tape member 24 has a size and configuration sized to fit snugly within lip portion 10c of the cover member and is adhesively secured at its inner face 24c to the inner face 22b of the main body portion 22a of the cover member.

Magnetic tape member 26 is substantially identical to magnetic tape member 24 and includes cutouts 26a and 26b corresponding to door panel cutouts 14 and 18 and is adhesively secured at its inner face 26c to door panel 10 with cutouts 26a and 26b respectively surrounding and providing access to manual actuator member 12 and power actuator member 16.

Magnetic tape members 24, 26 have an individual thickness less than the depth of the recess defined on the inner face of the cover plate member by lip portion 22d and a combined thickness greater than the recess depth so that, as seen in FIG. 5, member 24 is totally received within the cover plate member recess, member 26 may seat within the outer portion of the recess, and the inner edge of lip portion 22c will be spaced slightly from door panel 10.

In the use of the cover plate assembly of the FIGS. 4 and 5 embodiment, magnetic tape member 26 is permanently affixed to door panel 10 in surrounding relation to actuator members 12 and 16 and with its cutouts 26a and 26b allowing access to actuator members 12 and 16 to allow the operator to either manually or electrically lock and unlock the door locking mechanism. Magnetic tape member 24 is applied to the inner face 22b of the main body portion 22a of the cover plate member and the cover plate member, together with the adhesively secured magnetic tape member 24, would normally be kept in a stowed position in the vehicle. When the vehicle is left in any situation where there is a theft concern, the operator, prior to leaving the vehicle, retrieves the cover plate member 22 from storage and places the cover plate member over the magnetic tape member 26. As the cover plate is moved into position, locator flange portion 22d moves into recess 10a in panel 10 and guides along wall 10b and into abutting engagement with wall 10c to positively and quickly pilot the cover plate member into its proper position with respect to the magnetic tape 26 and with respect to actuator members 12 and 16. As the cover plate is moved into position over magnetic plate 26, magnetic tape member 26 seats snugly within the lip portion 22c of the cover plate member and moves into magnetic engagement with magnetic tape member 24 carried by the cover plate member to firmly secure the cover plate to the door panel 10 in overlying relation to actuator members 12 and 16. The magnetic attraction as between members 24 and 26 precludes inadvertent or unauthorized withdrawal of the cover plate from the door panel and the snug seating engagement of member 26 within the lip portion of the cover plate member precludes lateral or vertical displacement of the cover plate member from its position overlying the actuator members. A thief attempting to move either the power actuator member 16 or the manual actuator member 12 to an unlocked position to gain access to the vehicle or its contents will thus be prevented by the cover plate member 22 from accessing either actuator member. And any attempt to insert a stick or other instrument through the elastomeric door or window seals of the vehicle in an attempt to dislodge the cover plate 22 from its protective position overlying the actuator members will be prevented by the magnetic attraction as between members 24 and 26 and by the snug seating engagement of member 26 within the lip portion 22c of the cover plate.

Figure 6:
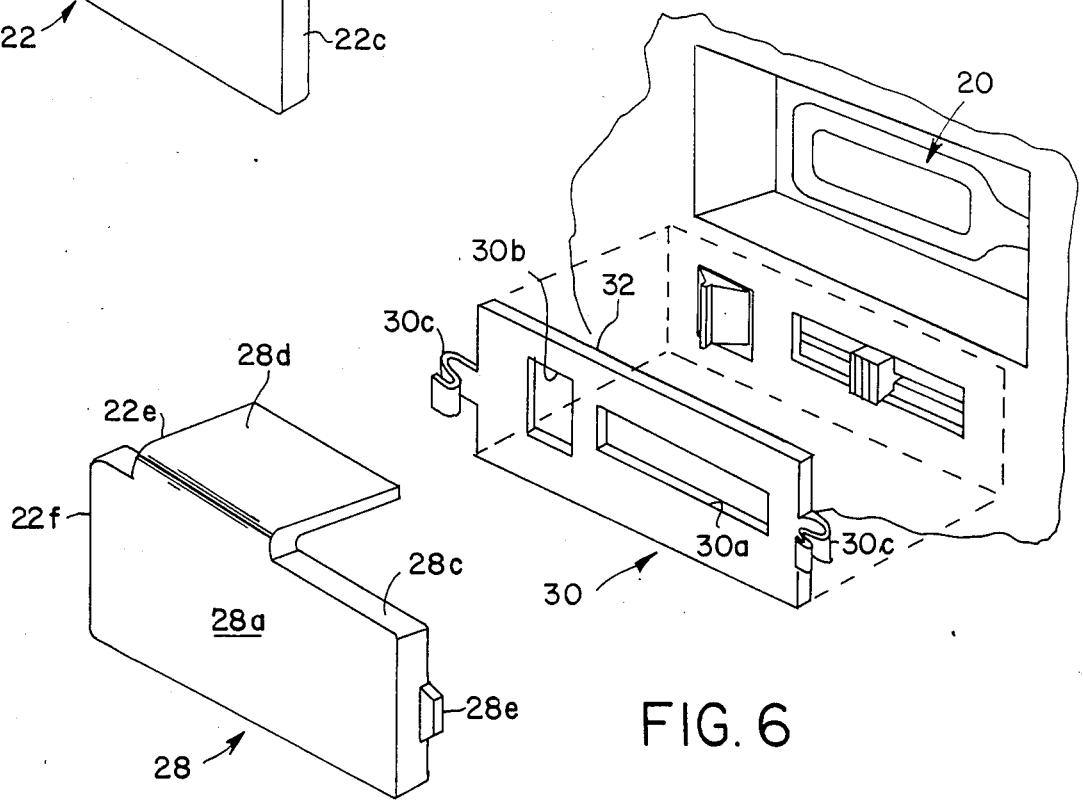
FIG. 6 is an exploded fragmentary perspective view of a second embodiment of the invention cover plate assembly.

The anti-theft cover assembly of the FIGS. 6 and 7 embodiment includes a cover plate member 28 and an attachment plate 30.

Cover plate member 28, like cover plate member 22, is formed of a suitable plastic material and includes a generally rectangular main body portion 28a having an inner face 28b, a lip portion 28c extending totally around main body portion 28a and extending inwardly from the inner face 28b of the main body portion, and a locator flange portion 28d extending inwardly from the inner face of the main body portion along the upper side edge of the main body portion and at right angles with respect to the main body portion and sized to move into the recess 10a in the interior door panel 10. Cover plate member 28 further includes lugs 28e Extending outwardly from opposite side wall portions of lip 28c.

Attachment plate 30 is formed of a suitable rigid plastic material and has a rectangular configuration generally corresponding to the rectangular configuration of main body portion 28a of cover plate member 28. Attachment plate 30 includes cutouts 30a and 30b corresponding in size and configuration to cutouts 18 and 14 in door panel 10 and further includes integral spring clip portions 30c positioned on opposite side edges of plate member for coaction with the lugs 28e on the cover plate member.

In the use of the anti-theft cover assembly of the FIGS. 6 and 7 embodiment, attachment plate 30 is permanently secured to door panel 10 by the use of suitable means such as double sided adhesive tape 32. When positioned on the door panel, openings 30a and 30b allow the operator ready access to actuator members 12 and 16 and the cover plate member is stored in a suitable location within the vehicle. When the vehicle is left and there is a theft concern, the operator positions cover plate 28 against attachment plate 30 with clip portions 30c of the attachment plate snappingly engaging lug portions 28e of the cover plate and locator flange portion 28d piloting into recess 10a in the door panel to positively and securely locate the cover plate with respect to the attachment plate and with respect to the door panel.

Figure 8:
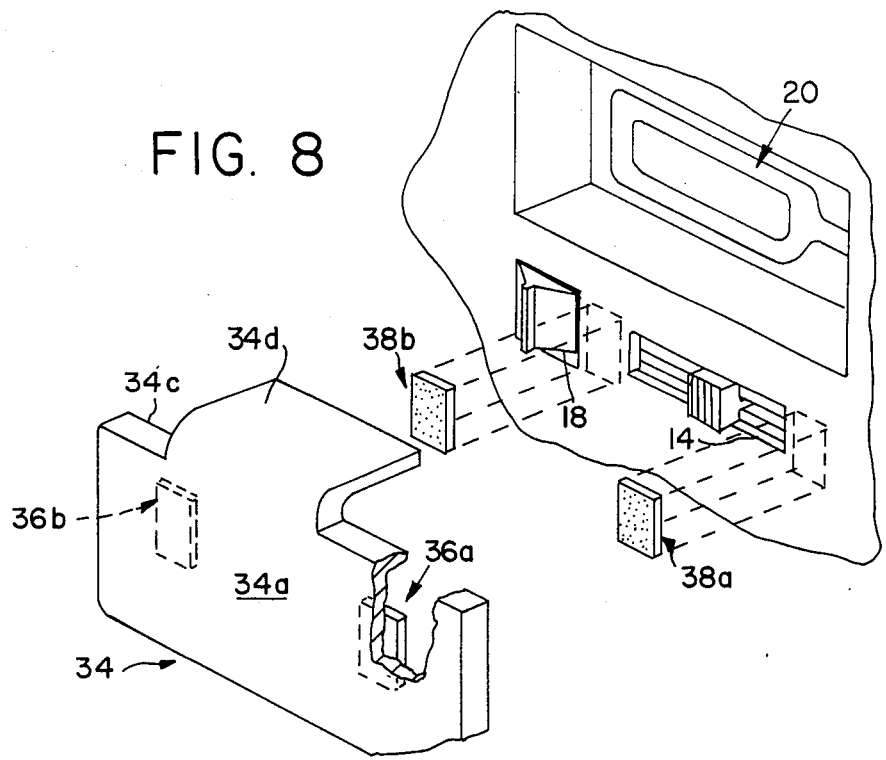
FIG. 8 is an exploded fragmentary perspective view of a third embodiment of the invention cover plate assembly.

The anti-theft cover assembly of the FIGS. 8 and 9 embodiment includes a cover plate member 34, first attachment means 36, and second attachment means 38.

Cover plate member 34 is identical to the cover plate 22 of the FIGS. 4 and 5 embodiment and includes a rectangular main body portion 34a having an inner face 34b, a lip portion 34c extending all the way around main body portion 34a, and a locator flange portion 34d.

First attachment means 36 comprise rectangular pieces 36a, 36b of VEL , or similar material having gripping member suitably secured to the inner face 34b of the main body portion of plate member 34 in laterally spaced relation and second attachment means 38 include further pieces 38a, 38b of VELCO or similar material having gripping members that are complimentary with respect to the gripping members of the pieces 36a, 38b.

In the use of the anti-theft cover assembly of the FIGS. 8 and 9 embodiment, VELCO members 38a, 38b are suitably secured, as by the use of double adhesive tape, to door panel 10 with piece 38a positioned to the right of opening 14 as viewed in FIG. 8 and piece 38b positioned between panel openings 18 and 14. Cover plate member 34, with attached Velcro pieces 36a, 36b, is normally kept in a stowed position within the vehicle but is retrieved when the vehicle is left in a theft environment and applied to the door panel with locator flange portion 34d piloting into door panel recess 10a and Velcro pieces 36a, 36b respectively engaging Velcro pieces 38a, 38b to securely position the cover plate member on the door panel in overlying relation to door actuator members 12 and 16.

The anti-theft cover assemblies according to the invention will be seen to provide a ready, inexpensive, and effective means of preventing theft with respect to vehicles equipped with door actuators located in the interior door panel of the door assembly. The door attachment means of the assemblies are unobtrusive in normal use of the vehicle and allow ready access to the door actuator members, and yet the cover plate member may be readily and effectively secured to the door panel in covering relation to the door actuator members by a single direct movement of the cover panel member against the door panel.

Whereas preferred embodiments of the invention have been illustrated and described in detail, it will be apparent that various modifications may be made in the disclosed embodiments without departing from the scope or spirit of the invention.

I claim:

1. An anti-theft cover assembly for use on the interior panel of an automobile door assembly of the type including a door locking mechanism actuable by an actuator member positioned in an opening in the interior door panel and movable by an operator positioned within the vehicle between locked and unlocked positions to respectively lock and unlock the door, said cover assembly comprising:
   (A) a rigid cover plate member sized and configured to fit over and cover the actuator member and including a planar main body portion and a lip portion extending substantially totally around the periphery of said main body portion and extending inwardly from the inner face of said main body portion to define a recess;
   (B) an attachment member;
   (C) means for permanently securing said attachment member to said door panel adjacent the actuator member;
   (D) securement means on said cover plate member operative in coaction with said attachment member to releasably secure said cover plate member to said attachment member and mount said cover plate member on the interior door panel in a position overlying the actuator member with the actuator member and said attachment member received within said recess of said cover plate member to cover said attachment member and preclude unauthorized access to the actuator member.

2. A cover assembly according to claim 1 wherein:
   (E) said securement means are operative to releasably secure said cover plate member to said attachment member in response to movement of said cover plate member toward the door panel in a direction generally normal to the plane of the door panel and are operative to release said cover plate member from said attachment member by movement of said cover plate member in an opposite direction away from the door panel.

3. A cover assembly according to claim 2 wherein
   (F) said plate member further includes a locator flange portion extending inwardly from said inner face of said main body portion along one side of said main body portion and at right angles with respect to said main body portion and sized to move into a recess in the inner door panel adjacent the actuator member in response to movement of said cover plate member in said normal direction to locate said cover plate member relative to the actuator member.

4. A cover assembly according to claim 1 wherein:
   (E) said attachment member comprises a sheet member including a cutout sized to clear the actuator member; and
   (F) said sheet member is positioned on the interior door panel with said cutout in surrounding relation to the actuator member.

5. A cover assembly according to claim 4 wherein:
   (G) said sheet member has a size and configuration sized to fit snuggly within said lip portion of said cover plate member so as to preclude lateral movement of said cover plate member on the interior door panel when said cover plate member is positioned over said sheet member.

6. A cover assembly according to claim 1 wherein:
(E) said attachment member comprises a first magnetizable tape member adapted to be secured to the surface of the interior door panel surrounding the actuator member; and
(F) said securement means comprises a second magnetizable tape member secured to the inner face of said cover plate member.

7. A cover assembly according to claim 6 wherein:
(G) at least one of said magnetizable tape members is magnetized.

8. A cover assembly according to claim 7 wherein:
(F) both of said magnetizable tape members are magnetized.

9. A cover assembly according to claim 1 wherein:
(E) said attachment member comprises an attachment plate member having a cutout therein and including peripheral catch means;
(E) said permanently securing means comprises means for securing said attachment plate member to the interior door panel with said cutout surrounding the actuator member to provide access thereto; and
(F) said securement means on said cover plate member includes peripheral catch means for releasable coaction with said peripheral catch means on said attachment plate.

10. A cover assembly according to claim 9 wherein:
(G) said peripheral catch means on said attachment plate comprises spring clip means positioned on diametrically opposed side edges of said attachment plate; and
(H) said peripheral catch means on said cover plate member includes lug means positioned on diametrically opposed side edges of said cover plate member.

11. An anti-theft cover assembly for use on the interior panel of an automobile door assembly of the type including a door locking mechanism actuable by an actuator member positioned in an opening in the interior door panel and movable by an operator positioned within the vehicle between locked and unlocked positions to respectively lock and unlock the door, said cover assembly comprising:
(A) a rigid cover plate member sized to fit over and cover the actuator member;
(B) an attachment sheet member, including a cutout, adapted to be secured to the interior door panel with said cutout surrounding the actuator member to allow access thereto; and
(C) means on said cover plate member coacting with said attachment sheet member to releasably mount said cover plate on the interior door panel in a position overlying said attachment sheet member and overlying the actuator member to preclude unauthorized access to the actuator member;
(D) said cover plate member including a planar main body portion and a lip portion extending around the periphery of said main body portion and extending inwardly from the inner face of said main body portion;
(E) said attachment sheet member having a size and configuration sized to fit snuggly within said lip portion of said cover plate member so as to preclude movement of said cover plate member on the interior door panel when said cover plate member is positioned over said attachment sheet member.

* * * * *